(12) United States Patent
Valishin (10) Patent No.: US 9,523,790 B1
(45) Date of Patent: Dec. 20, 2016

(54) HYBRID SENSING APPARATUS AND METHOD

(71) Applicant: Sercel, Carquefou (FR)

(72) Inventor: Oleg Valishin, Carquefou (FR)

(73) Assignee: SERCEL, Carquefou (FR)

(*) Notice: Subject to any disclaimer, the term of this patent is extended or adjusted under 35 U.S.C. 154(b) by 0 days.

(21) Appl. No.: 15/146,126

(22) Filed: May 4, 2016

(51) Int. Cl.
| | |
|---|---|
| G01N 21/00 | (2006.01) |
| G01V 11/00 | (2006.01) |
| G01V 1/22 | (2006.01) |
| G01V 1/44 | (2006.01) |
| G01V 1/24 | (2006.01) |
| E21B 47/12 | (2012.01) |

(52) U.S. Cl.
CPC ............ G01V 11/002 (2013.01); E21B 47/12 (2013.01); G01V 1/226 (2013.01); G01V 1/24 (2013.01); G01V 1/44 (2013.01)

(58) Field of Classification Search
CPC .. G01V 1/181; G01B 11/002; H01J 37/32935; G01N 21/64; G01N 21/68; G01N 2015/1037; G01J 3/02
See application file for complete search history.

(56) References Cited

U.S. PATENT DOCUMENTS

| | | | |
|---|---|---|---|
| 6,885,918 B2 | 4/2005 | Harmon et al. | |
| 2002/0196993 A1* | 12/2002 | Schroeder | G01L 1/246 385/12 |
| 2012/0046866 A1 | 2/2012 | Meyer et al. | |

FOREIGN PATENT DOCUMENTS

WO 2014/199300 A2 12/2014

OTHER PUBLICATIONS

T.M. Daley et al., "Field Testing of Fiber-Optic Distributed Acoustic Sensing (DAS) for Subsurface Seismic Monitoring", Nonreflection Seismic and Inversion of Surface and Guided Waves, The Leading Edge, Jun. 2013, pp. 399-706.
B.G. Frignet et al., "Optical Vertical Seismic Profile on Wireline Cable", SPWLA 55th Annual Logging Symposium, May 18-22, 2014, pp. 1-16.

* cited by examiner

Primary Examiner — Abdullahi Nur
(74) Attorney, Agent, or Firm — Patent Portfolio Builders PLLC (57) ABSTRACT

A hybrid sensing apparatus for collecting data. The apparatus includes an optical sensing component having an optical cable that acquires a first set of data and an electrical sensing component having sensor tools that acquires a second set of data. The electrical sensing component extends parallel to the optical cable for a first length (L1) and then antiparallel to the optical cable for a second length (L2), said sensor tools being located along the second length (L2) of the electrical sensing component.

23 Claims, 8 Drawing Sheets

HYBRID SENSING APPARATUS AND METHOD

BACKGROUND

Technical Field

Embodiments of the subject matter disclosed herein generally relate to an apparatus and method for acquiring data, and more specifically, to a system that uses conventional seismic sensors and a distributed acoustic sensing system for collecting data, for example, inside a borehole.

Discussion of the Background

To extract hydrocarbon fluids (e.g., oil and gas) from a geological formation that is located underground (subsurface), a well needs to be drilled into the earth, either below the water (in a marine environment) or at the earth's surface (land environment). In both situations, various drilling equipment needs to be lowered into the well, most of the times at depths at which the ambient temperatures and pressures are so high that available electronic components are quickly damaged. After the drilling phase, the well is exploited, which means that other type of equipment needs to be installed to allow the hydrocarbon fluids to exit the underground formation. During this production phase, the flow of hydrocarbon fluids needs to be monitored, i.e., measured with various electronic components.

When the hydrocarbon fluid production decreases, there are available methods (e.g., injection of various fluids that promote the flow of hydrocarbon fluids) for enhancing the oil recovery. These methods require different equipment and knowledge of the well.

All these above-discussed methods share the need to monitor the well, to know the various parameters (e.g., temperature, pressure, density, flow, etc.) of the well and its surrounding, so that the appropriate tool can be deployed in the well and the well is appropriately managed.

There are many devices and systems for measuring/monitoring the parameters of the well and/or around the well. The traditional device is a temperature and/or pressure tool, which is attached to a cable and lowered in the well for measuring the temperature and/or pressure. As noted above, the various electronic components that are located in such tools are negatively impacted by the high temperature, which can exceed 170° C., and in some cases can reach 250° C. Thus, the depth at which these traditional tools are deployed is limited, among others, by the temperature inside the well.

Another traditional device that is deployed inside a well is a seismic sensor, e.g., a geophone. Seismic sensors may be deployed, also attached to a cable, inside the well for measuring seismic signals, either associated with micro-seismic events that happen in the earth, or for measuring seismic signals that are generated by a seismic source at the surface, and then reflected from various geophysical formations underground. The micro-seismic events may be generated due to hydraulic fracturing, or to the extraction of hydrocarbon fluid from underground and the subsequent rearranging of the ground. The seismic source is a man-made source specifically designed to generate acoustic signals that propagate to the geophysical formations of interest and the reflected waves are recorded by the seismic sensors for generating an image of these geophysical formations.

In an effort to overcome the weaknesses of the electronic components of the underground sensors, a new technology has recently been introduced to the oil and gas field. This new technology, distributed acoustic sensing (DAS), uses one or more optical fibers for measuring various parameters inside the well. For an introduction to this technology, see U.S. Patent Application Publication No. 2012/0046866. One advantage of the DAS is that the optical fiber can withstand a high temperature environment much better than the existing electronic components. However, this technology has various limitations on its own, e.g., an interpolation process is used to associate the value of a measured parameter with its actual location underground, whereas an actual location of the measured parameter is not that precise compared to the physical location of the seismic sensor tools, the optical fiber is linear and continuous, without dedicated sensing points. Moreover, the step of data processing is difficult, especially since the measurement concerns an optical constraint (and not a direction of movement), which has to be correlated to useful seismic data.

Thus, there is a need for a device and method that overcome the above noted limitations and provide accurate downhole measurements.

SUMMARY

In various embodiments, a hybrid sensing apparatus is provided for measuring one or more parameters associated with oil and gas exploration.

In one embodiment, there is a hybrid sensing apparatus for collecting data. The apparatus includes an optical sensing component having an optical cable that acquires a first set of data and an electrical sensing component having sensor tools that acquires a second set of data. The electrical sensing component extends parallel to the optical cable for a first length (L1) and then antiparallel to the optical cable for a second length (L2), said sensor tools being located along the second length (L2) of the electrical sensing component.

According to another embodiment, there is a method for collecting data with a hybrid sensing apparatus. The method includes lowering into a well the hybrid sensing apparatus, wherein the hybrid sensing apparatus includes an optical sensing component and an electrical sensing component, acquiring a first set of data with the optical sensing component, and acquiring a second set of data with the electrical sensing component. The electrical sensing component extends parallel to the optical sensing component for a first length (L1) and then antiparallel to the optical sensing component for a second length (L2).

According to still another embodiment, there is a hybrid sensing apparatus for collecting data inside a well. The apparatus includes a hybrid cable extending inside the well, from a head of the well, the hybrid cable including a first electrical cable and an optical fiber that run in parallel to each other; a telemetry unit connected to the hybrid cable; a second electrical cable extending from the telemetry unit back toward the head of the well; and plural sensor tools located along the second electrical cable. Both the optical fiber and the plural sensor tool collect data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. In various embodiments as illustrated in the figures, an apparatus and method for measuring one or more parameters associated with oil and gas exploration is discussed.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a hybrid sensing apparatus for collecting data includes an optical component that acquires a first set of data and an electrical component that acquires a second set of data. The electrical component extends parallel to the optical component for a first length and then antiparallel to the optical component for a second length.

As will be discussed later, the hybrid sensing apparatus can be used for measuring one or more parameters in a well, on land or in a marine environment associated with oil and gas exploration. For simplicity, the following embodiments are illustrated with regard to a well. This does not mean that the novel hybrid sensing apparatus is limited so such environment.

As discussed in the Background section, there is a need to measure various parameters in a well. In addition to temperature, pressure, flow, or density in a well, a vertical seismic profile (VSP) technique is used to generate a seismic image of the well's surroundings. The VSP deploys seismic sensors in the well, and then shoots a seismic source located on the ground or in a different well, for generating seismic waves. The seismic waves propagate from the seismic source into the ground and then they get reflected and/or refracted on various geophysical underground structures. Part of these reflected and/or refracted waves propagate toward the seismic sensors located in the well and are recorded by these sensors. Based on the recorded seismic signals, an image of the oil and gas reservoir around the well is determined. By monitoring these images, one skilled in the art is able to estimate the "health" of the well, whether an intervention is necessary to increase the well production, i.e., to manage the well.

Figure 1:
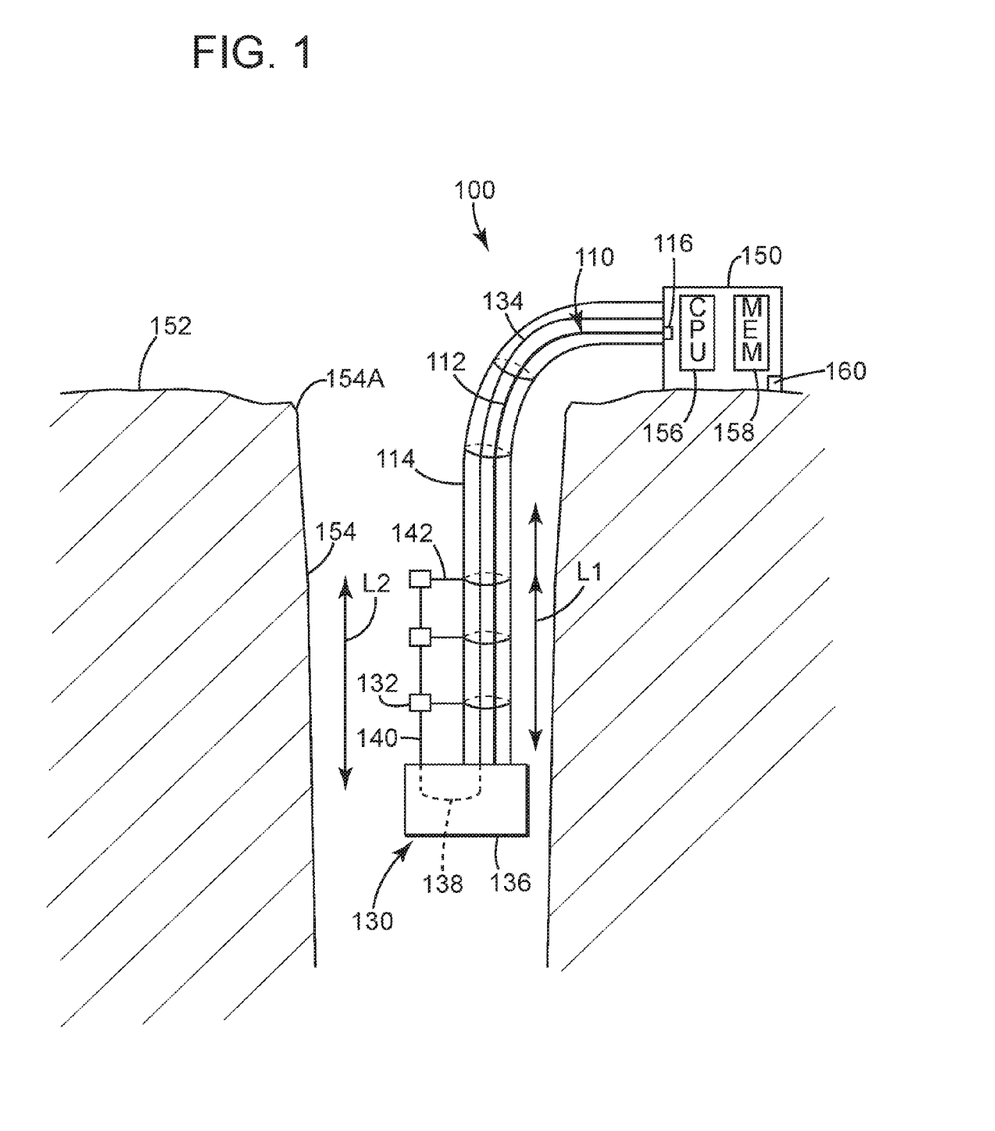
FIG. 1 depicts a hybrid sensing apparatus deployed in a well.

With this context in mind, FIG. 1 illustrates an embodiment according to the invention in which a hybrid sensing apparatus 100 includes an optical sensing component 110 and an electric sensing component 130. The optical sensing component 110 is defined as a system that includes at least an optical cable 112, e.g., an optical fiber, which acts as a conduit for light, while the electric sensing component 130 is defined as above, i.e., a system that includes at least one sensor 132 that measures a parameter inside the well and generates an electric signal indicative of the measured parameter. The at least one sensor can be a geophone, accelerometer, hydrophone, temperature sensor, pressure sensor, a crystal, etc.

FIG. 1 shows the electrical sensing component 130 extending, inside the well, parallel to the optical cable 112 for a length L1, turning around (U-turn), and then extending anti-parallel to the optical cable 112 for a length L2. In this application, the term "anti-parallel" is understood to mean two lines that are physically substantially parallel to each other, but from a functional point of view, the two lines are connected in series. In one application, like for wells, length L2 is shorter than length L1. FIG. 1 shows hybrid sensing apparatus 100 having a hybrid cable 114 that includes the optical cable 112 and an electrical cable 134. Hybrid cable 114 extends from a head 154A of the well 154, inside the well. Electrical cable 134 extends from a controller 150, located on ground 152, to a telemetry unit 136, located in well 154. Electrical cable 134 may be a traditional copper cable, a heptacable, or any other cable that is currently being used inside a well. Electrical cable 134 may transmit electrical power and/or data to and from sensor 132. Controller 150 may include a processor 156 and a memory 158 that are connected to optical component 110 and electrical cable 134. Controller 150 may also include a power source 160 or it may be connected to a power source.

Telemetry unit 136 may receive both the electrical cable 134 and optical component 110. If an optical fiber 112 is used as part of the optical component 110, the optical fiber 112 terminates inside telemetry unit 136 for the embodiment illustrated in FIG. 1. This is not the case for later embodiments. Electrical cable 134 is electrically connected, through an electrical element 138, to another electrical cable 140 that directly electrically (and mechanically) connects to sensor 132. In this way, sensor 132 can receive power from controller 150 and can exchange data and/or commands with controller 150. Electrical cable 134, telemetry unit 136, electrical cable 140, and sensor 132 form electrical component 130.

Electrical cable 140 may be connected to more than one sensor 132. While FIG. 1 shows electrical cable 140 connected to three sensors 132, it is possible to have this electrical cable connected to any number of sensors.

Note that according to the embodiment illustrated in FIG. 1, electrical cable 134 and electrical cable 140 are anti-parallel to each other and sensors 132 extend from the telemetry unit 136 upwards, toward the ground 152. In one application, electrical cables 134 and 140 are a single electrical cable having a U-turn part inside telemetry unit 136.

FIG. 1 further show that sensors 132 are mechanically coupled, through attachment 142, to hybrid cable 114. This allows the weight of sensors 132 to be supported by hybrid cable 114, so that electric cable 140, for the length L2, can be designed and dimensioned only for transmission of data and power and not for supporting the load of the sensors.

In one embodiment, sensors 132 are fixedly attached to hybrid cable 114, such that no sensor can move up or down relative to optical component 110. Having the sensors 132 fixedly attached to the hybrid cable 114 makes it possible a calibration of the optical component relative to the electrical component, which none of the existing systems is capable of. More specifically, assume that three sensors 132 are lowered into well 154 as illustrated in FIG. 1. By knowing the length of the electrical cable 134, and implicitly the length of the hybrid cable 114, from the surface to each of the sensors, it is possible, when recording seismic data, to associate a trace measured by each sensor with a corresponding depth. These measurements are possible to be made exclusively with the electrical component 130. At the same time, by measuring the same seismic signals with the optical component 110, it is possible to measure/calculate the same traces. However, as the optical fiber of the optical component does not have specific sensors at given locations, the measured/calculated traces are obtained by an interpolation process, that approximately associates each trace with a location along the optical fiber.

When combining the measurements acquired with the electrical component and those acquired with the optical component, it is possible to place more accurately each measured trace at its location along the optical fiber, thus being able to depth calibrate the optical component for seismic responses. The same may be obtained if instead of a seismic sensor, temperature sensors 132 are used as the optical fiber is also able of measuring temperatures.

Figure 2:
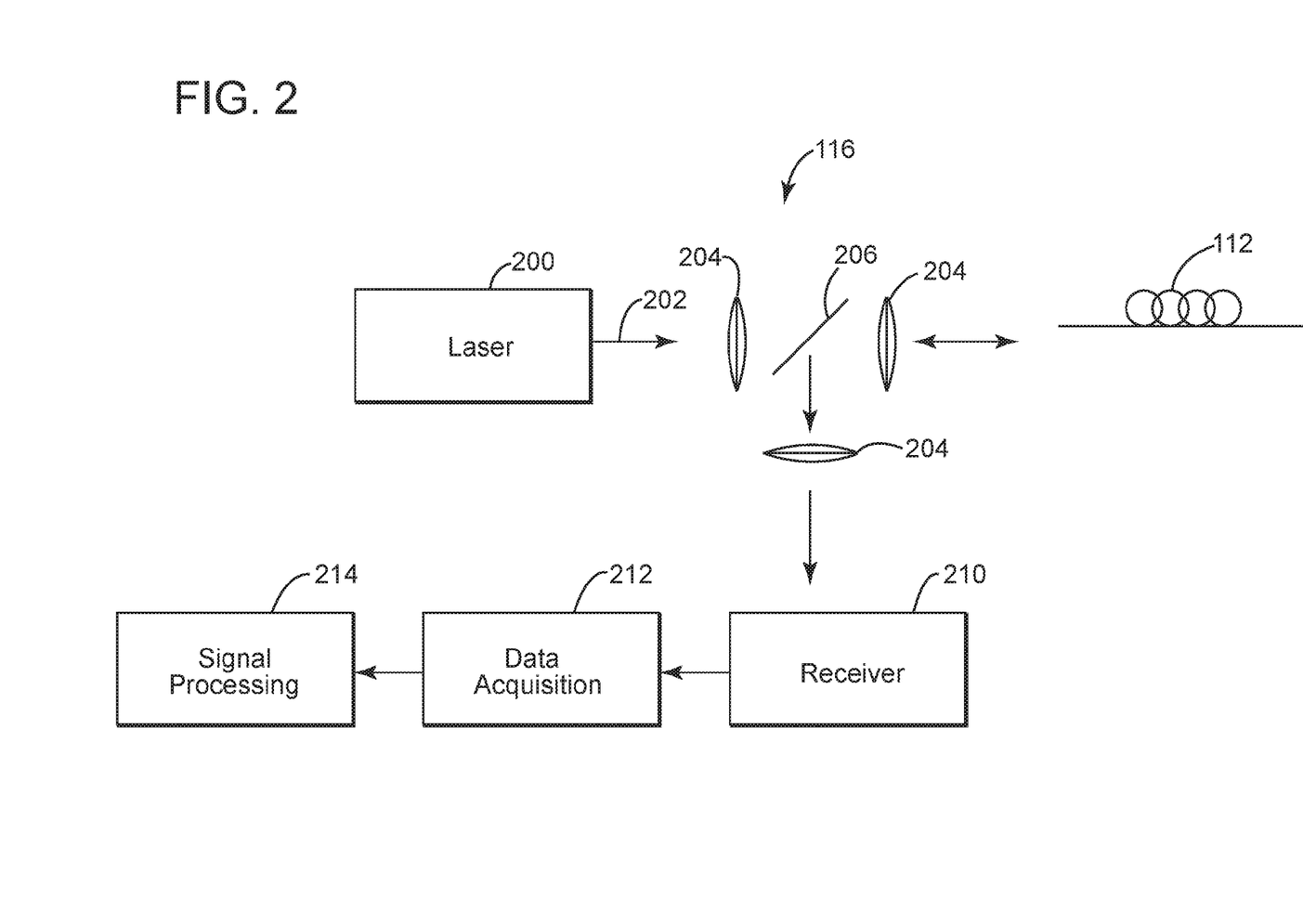
FIG. 2 illustrates an optical interrogator device to be used with a hybrid sensing apparatus.

In this regard, it is known that an optical fiber is capable of measuring a strain exerted on the fiber by changes in pressure, temperature and/or acoustic noise. This is achieved by using an optical interrogator device 116, which may be located inside or outside controller 150. Optical interrogator device 116 is shown in FIG. 2 having a light generating device 200 (e.g., a pulse laser) that generates a light beam 202. Light beam 202 is sent through various optical elements 204 (e.g., lenses, apertures, etc.) and mirrors 206 to optical fiber 112. A light reflected from the optical fiber 112, which is indicative of the temperature, pressure or acoustic noise that generated a strain on the fiber, is sent by semi-transparent mirror 206 to a receiver 210, which records the light intensity versus time. A data-acquisition unit 212 collects this data in time and a signal processing unit 214 processes the data for determining the locations along the fiber where the strain changes have occurred. As known in the art, the acoustic noise detected by the fiber may be mathematically processed for determining a corresponding trace, i.e., information related to seismic sensing.

Figure 3:
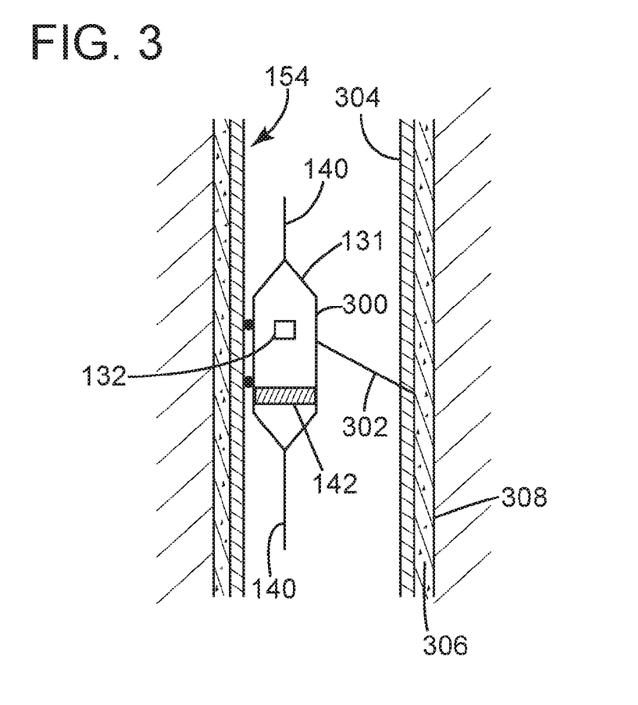
FIG. 3 illustrates a sensor tool that can be combined with a hybrid sensing apparatus.

Returning to FIG. 1, attachment 142 may be implemented in various ways. One way is discussed with regard to FIG. 3, which shows a single sensor tool 131 being connected to electrical cable 140. Note that sensor tool 131 may replace sensor 132 in FIG. 1 so that sensor tools 131 are attached to electrical cable 140 in FIG. 1 and each sensor tool 131 may have a housing and the sensor 132 located inside the housing. Sensor tool 131 has a housing 300 that accommodates sensor 132. Housing 300 may have a retractable wing 302 that may swing away from the housing, for contacting a wall 308 of well 154. Note that in most practical situations, well 154 has a casing 304 that is cemented with cement 306 to the wall 308 of the well 154. In this way, sensor tool 131 is fixed to the casing and implicitly to the well, for better collecting seismic data. An example of such sensor tool is disclosed in U.S. Patent Publication no. 2016/0010409 (the entire content of which is incorporated herein by reference), belonging to the assignee of this application. FIG. 3 also shows coupling means 142 being attached to housing 300.

Figure 4:
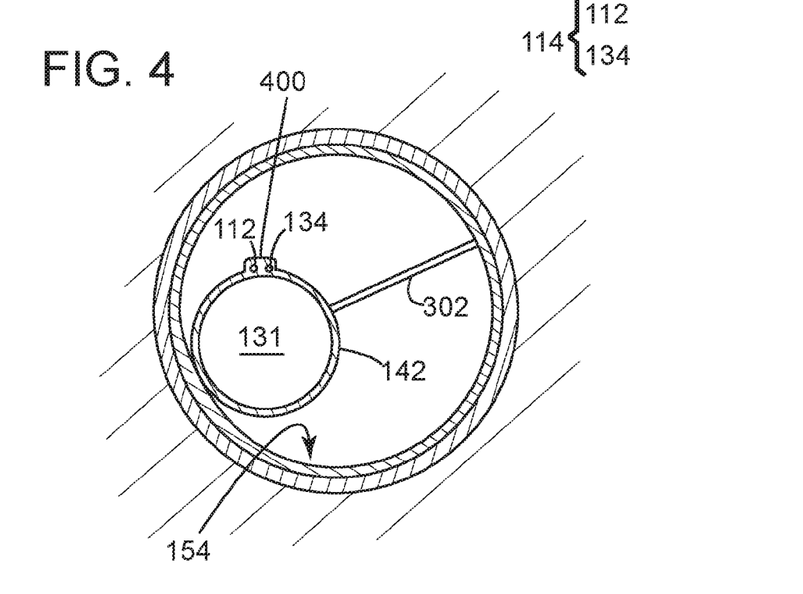
FIG. 4 illustrates a cross-section through a well, sensing tool and hybrid sensing apparatus.

FIG. 4 illustrates a cross-section through well 154 and sensor tool 131. Coupler 142 is a belt in this embodiment having a pocket 400 in which electrical cable 134 and fiber optic 112 are located. Coupling 142 could also be a device with two clips, one designed to be fixedly coupled to the housing 300 (see the housing in FIG. 3) and the other to the hybrid cable 114 or only to the electrical component part 134 thereof if the design of the hybrid cable 114 allows it. In one embodiment, hybrid cable 114 may be made so strong to support all sensor tools 131.

Figure 5:
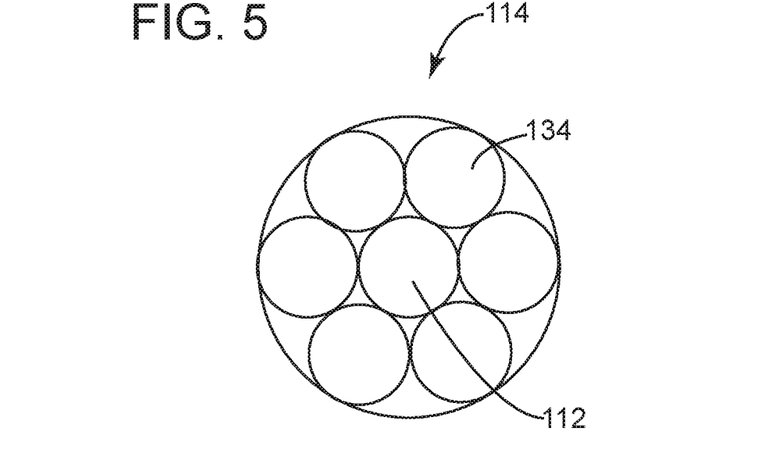
FIGS. 5 and 6 illustrate various profiles of a hybrid cable.
Figure 6:
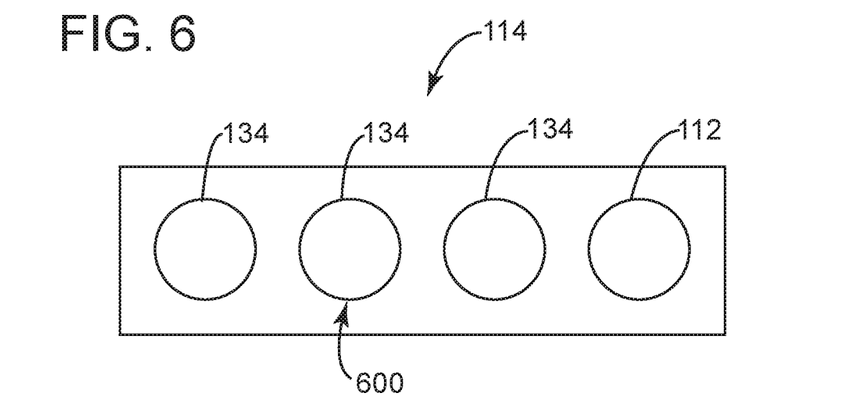

In an embodiment, hybrid cable 114 may be a heptacable with one wire replaced by optical fiber 112, as illustrated in FIG. 5. In another embodiment, hybrid cable 114 includes the electric cable 134, optical fiber 112 and a strength member 600 in a flat configuration as illustrated in FIG. 6. Note that although the figures show a single optical fiber 112, it is possible to replace the single optical fiber with a plurality of optical fibers.

Figure 7:
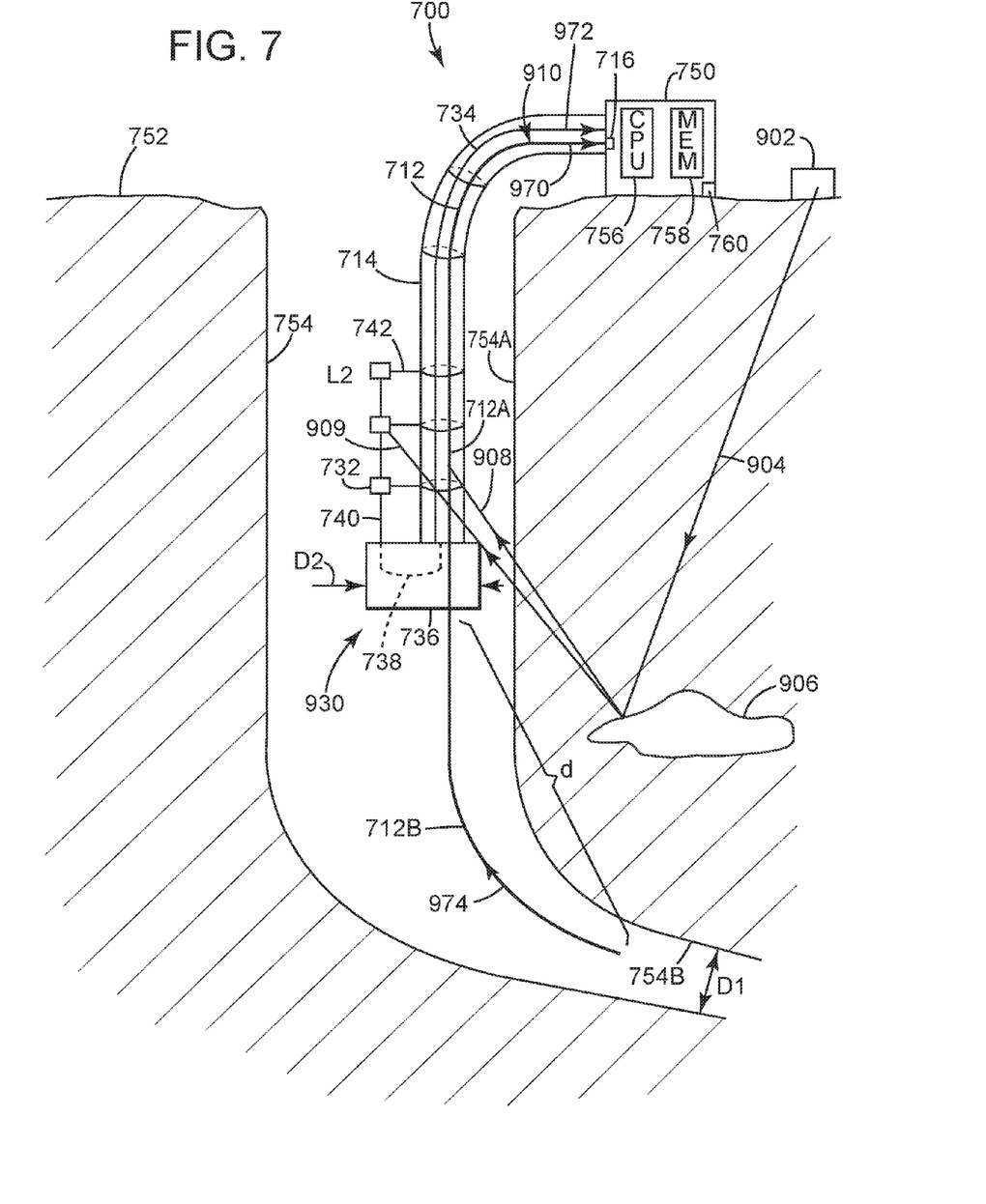
FIG. 7 illustrates another hybrid sensing apparatus, with a configuration for generating seismic data and collecting two different sets of data.

The hybrid sensing apparatus may be implemented in a different configuration, as illustrated in FIG. 7. In this configuration, hybrid sensing apparatus 700 is similar to hybrid sensing apparatus 100 except that the optical sensing component 710 extends beyond telemetry unit 736 and continues for a given distance "d" into the well; optical cable 712 can pass through telemetry unit 736. This given distance d can be in the range of meters to thousands of meters, for example, up to 3-4 km. Optical fiber 712 that makes the optical sensing component 710 is made of a single piece in both of the embodiments shown in FIGS. 1 and 7, i.e., it has no cuts along its length. This is so because a cut in the optical fiber introduces false light reflections, which is perceived as noise. Note that in FIG. 7, all the components similar to those in FIG. 1 have similar reference numbers. Optical fiber 712 has in this embodiment a first portion 712A that is located above telemetry unit 736 and a second portion 712B located below the telemetry unit. The two portions have no cut in between.

Second portion 712B of the optical fiber 712 extends further inside the well, into a region 754B that has a higher temperature than a region 754A, in which the hybrid cable is located. At this temperature, it is possible that the electronic parts of telemetry unit 736 and/or sensors 732 are quickly damaged. For that reason, the telemetry unit and sensors are not lowered in this hot part of the well, only the second portion 712B of the optical fiber. In this way, it is possible to obtain, for example, temperature measurements in the second region 754B of the well, while obtaining seismic data in the first region 754A of the well. With a single fiber optic, it is possible to obtain (simultaneously or not) two different measurements as the seismic data is recorded over a first range of frequencies while the temperature measurements are recorded over a second range of frequencies, usually lower than the first range.

An advantage of this embodiment is that the deeper the well, the narrower its internal diameter D1. This means, that there is a depth at which the external diameter D2 of the telemetry unit 736 may get to be larger than the internal diameter D1 of the well, which effectively prevents the hybrid cable to be further lowered into the well. For this case, the second portion 7126 of optical cable 710 is still narrow enough to enter the well. This means, that this hybrid sensing apparatus is capable of certain measurements where traditional devices are too large to fit inside the well.

Figure 8:
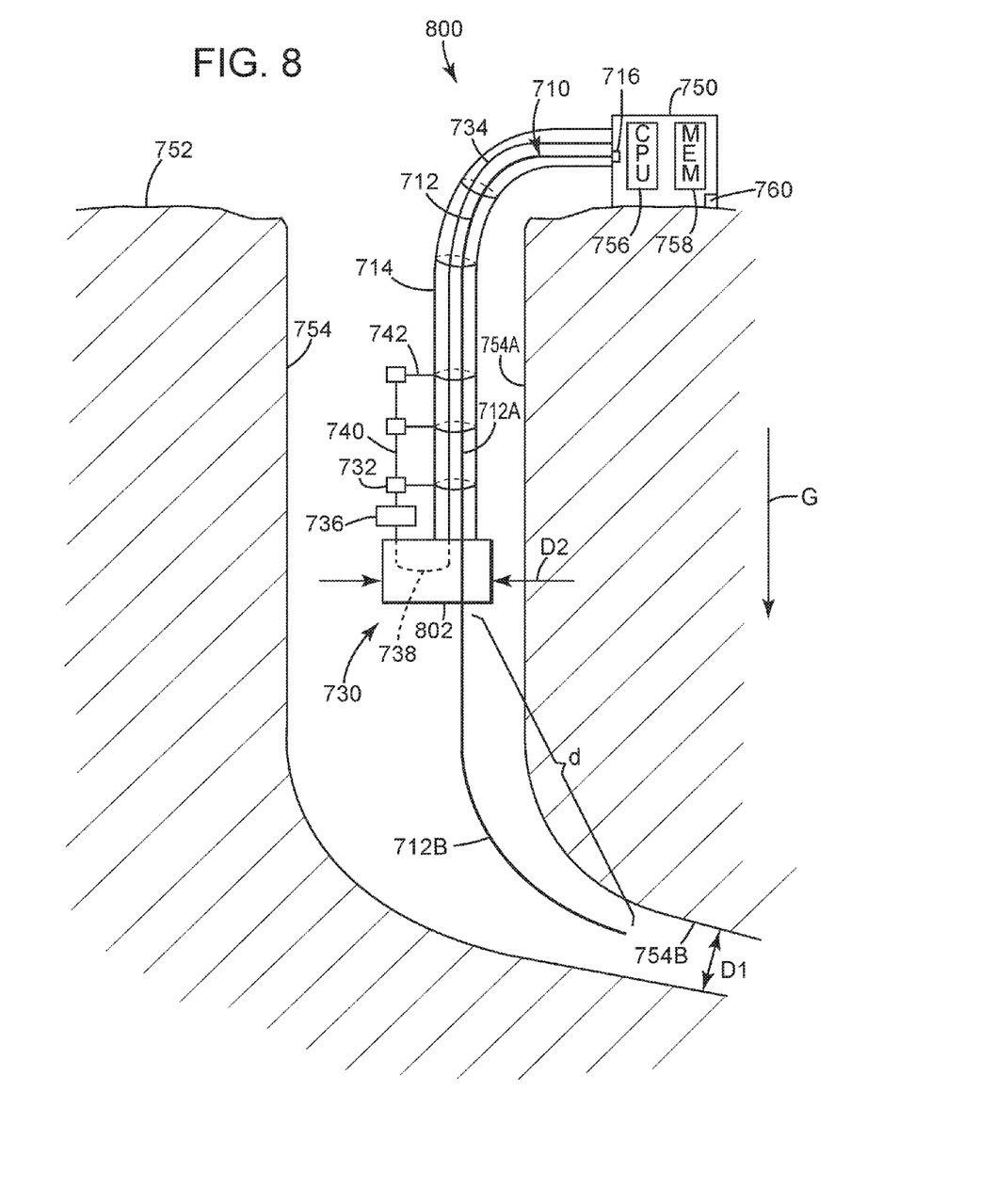
FIG. 8 illustrates still another hybrid sensing apparatus.

In another embodiment, as illustrated in FIG. 8, the telemetry unit 736 is separated from the hybrid cable 714, i.e., optical fiber 712 does not enter or connects to the telemetry unit 736. A connection box 802 receives the electrical cable 734 and accommodates its U-turn 738 and also receives the optical fiber 712. Telemetry unit 736 is moved above (relative to gravity G) connection box 802 and is still connected to cable 740 and sensors 732. Connection box 802 may include various electronic components (e.g., amplifiers, filters, splitters, digitizing units, etc.) for transmitting the data and/or commands between controller 750 and sensors 732. Note that in this embodiment, as in the previous one, fiber optic 712 is made of a single piece, i.e., there are no cuts along its entire length. In one application, a cut may be accommodated to insert, for example, a power booster or other optical equipment for enhancing the transmitted light.

While FIG. 8 illustrates hybrid sensing apparatus 800 having the fiber optic 712 extending past connection box 802, similar to the embodiment of FIG. 7, it is also possible to have the optic fiber terminating inside connection box 802, similar to the embodiment of FIG. 1.

While the previous figures show the hybrid sensing apparatus being deployed inside a land well, the same configurations may be deployed inside a marine well. Further, the configurations shown in the previous figures may also be deployed in a marine streamer or during land surface data acquisition. A feature of some of these embodiments is the U-turn of the electric cable 134 when exiting the hybrid cable 114. Another feature of some of these embodiments is the optical fiber having a first part inside the hybrid cable and a second part outside the hybrid cable.

Data acquisition using one or more of these embodiments is now discussed. According to one embodiment, as illustrated in FIG. 7, the hybrid sensing apparatus is used for VSP. VSP, as discussed above, is a technique for collecting seismic data from a well, where the data is relevant for geophysical features located around the well. FIG. 7 shows at least one seismic source 902 located on the ground. Seismic source 902 may also be located inside the well or another well. Seismic waves 904 are generated by the source into the ground. These waves propagate through the earth until being reflected and/refracted from a geological formation 906 (for example, an oil and gas reservoir). Some reflected waves 908 impinge on the optical fiber 712, creating a strain which changes locally the fiber's properties, and thus, this response is recorded by optical interrogator device 716. At the same time, some reflected waves 909 are recorded by sensor 732, which in this case is a seismic sensor.

Thus, controller 750 receives two sets of data, a first set 970 generated by the optical component 710 and a second set 972 generated by the sensors 732. Both sets of data may include seismic information, and, as already noted above, the second set may be used to improve the accuracy of the first set. Further, by combining the two sets of data at the processor 756, the accuracy of the recorded seismic traces and their locations is improved. Any known method may be used for this combination.

In a different embodiment, sensors 732 are not seismic sensors, but another type of sensors, for example, pressure sensors. In this embodiment, the first set of data 970 may be seismic data while the second set of data 972 is pressure data. This means that the hybrid sensing apparatus 700 can also record two different (seismic and pressure) sets of data. In one embodiment, the two sets of data are recorded simultaneously as the electrical sensing component 730 operates independent of the optical sensing component 710. In still another embodiment, the hybrid sensing apparatus 700 can acquire three different sets of data, a first set 970 of seismic data, a second set 972 of pressure data and a third set 974 of temperature data. In other words, the optical sensing component 710 is capable of acquiring, simultaneously or not, two different sets of data as the seismic data is acquired at one frequency range and the temperature data is acquired at a second frequency range. Those skilled in the art would understand that the seismic, pressure and temperature data sets are just examples, as the sensors and the optical fiber can measure other parameters, e.g., any parameter that impacts the strain on the optical fiber. Just as a further example, there is no need that either the electrical sensing component 730 or the optical sensing component 710 records seismic data. Either of these components may record any other data set necessary for well management.

While the above embodiments have been discussed with regard to mechanically attaching the sensors and corresponding sensing tools to the hybrid cable, it is also possible to have the hybrid cable attached to a device (e.g., wire line) that extends into the well. In one application, the hybrid cable may be attached to a production casing or another casing that is lowered inside the well. The hybrid sensing apparatus may be lowered at different locations inside the well, e.g., above a packer, below a packer, above, below or in a drainage zone, above, below or in a reservoir zone, in oil, gas, sand water areas. The sensors and optical fiber may be used to acquire not only seismic, pressure, temperature, flow or density data, but also data related to vibrations associated with the fluid inside the well, vibrations of the well itself, vibrations of the casing inside the well, movement of gas, oil, water, etc.

Sensors 132 may be single component (e.g., determine a vertical acceleration of the fluid inside the well) or multi-component (e.g., determine X, Y and Z accelerations of the fluid). Sensors 132 may include multiple devices, for example, a single sensor 132 may include a geophone and a temperature sensor. The number of sensors 132 may be from one to hundreds.

The embodiments discussed herein may take advantage of the optical fiber by extending it beyond the lowest point of the electrical component, so that the optical fiber is located where the temperature is highest.

Figure 9:
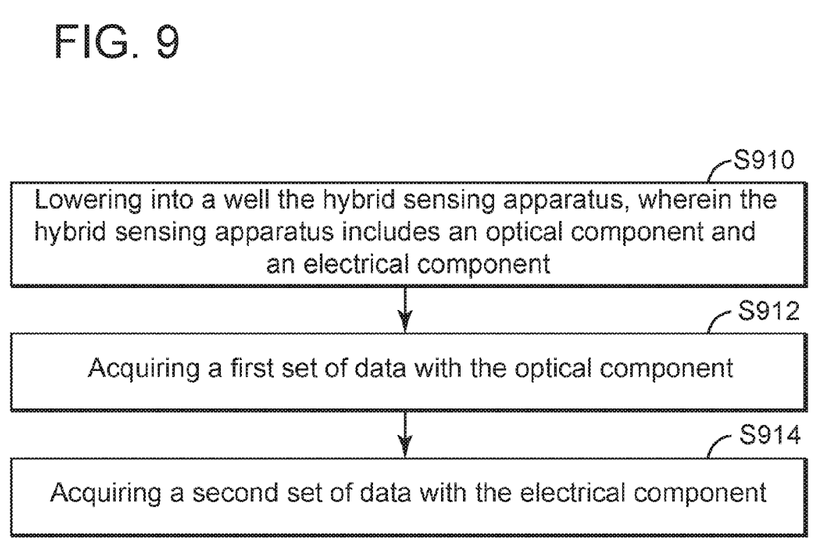
FIG. 9 is a flowchart of a method for collecting different data sets with a hybrid sensing apparatus.

According to an embodiment, a method for acquiring data with a hybrid sensing apparatus includes, as illustrated in FIG. 9, a step S900 of lowering into a well the hybrid sensing apparatus, wherein the hybrid sensing apparatus includes an optical component and an electrical component, a step S902 of acquiring a first set of data with the optical component, and a step S904 of acquiring a second set of data with the electrical component. The electrical component extends parallel to the optical component for a first length (L1) and then antiparallel to the optical component for a second length (L2). The method may also include additional steps, for example, (1) preparing the hybrid cable, which may have the optical cable extending for a distance d beyond the hybrid cable if any, (2) lowering the length d of the optical fiber (if present) into the well, (3) connecting telemetry unit 736 to the hybrid cable, (4) connecting electrical cable 740 to telemetry unit 736, (5) lowering partially the telemetry unit into the well, (6) connecting sensor 732 to electrical cable 740, (7) coupling sensor 732 to hybrid cable 714 through attachment 742, (8) repeating steps (5)-(7) for any further sensor, and (9) lowering the hybrid sensing apparatus so that the telemetry unit is at its aimed location.

Figure 10:
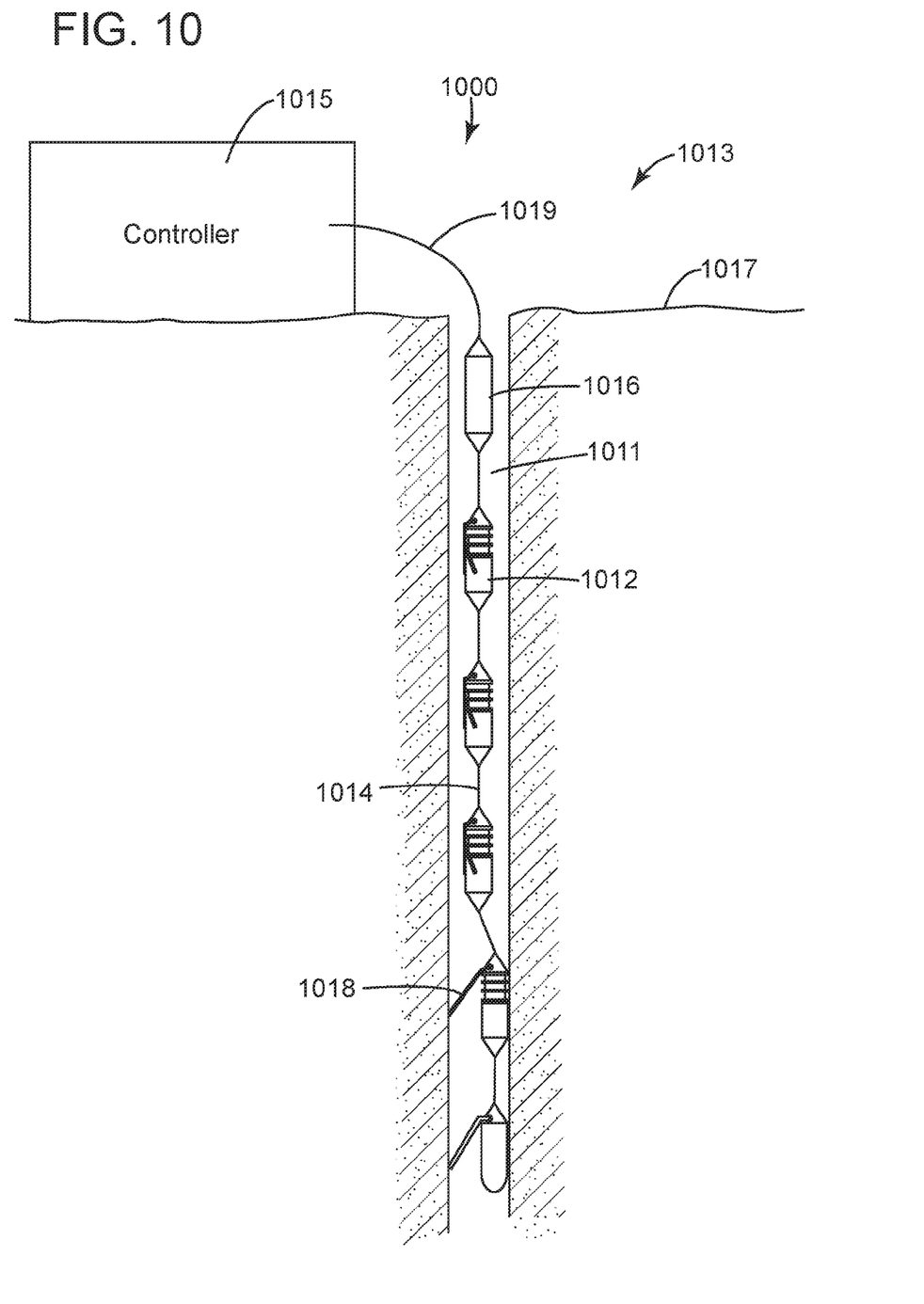
FIG. 10 shows a traditional VSP system.

FIG. 10 depicts a VSP system 1000 having an electric sensing component 1013 with plural down-hole tools 1012 deployed within a well 1011. Electric sensing component 1013 transfers sensed data from tools 1012 to a controller 1015, which might be located far from well 1011. The electric sensing component 1013 may include, in addition to tools 1012, a telemetry unit 1016, namely a processing unit for acquisition of seismic traces. Telemetry unit 1016 is connected through a cable 1014 to tools 1012. The term "trace" is understood herein as a record of the data from one seismic channel. Analysis of a succession of seismic, timely stamped, traces, describing velocity of waves (and/or acceleration, pressure variations, etc.) in the ground, provides information about the reaction of the ground to a seismic event and about the structure of underground layers. Telemetry unit 1016 may receive all the information from the tools (e.g., seismic data, temperature, pressure, but also information about the status of the tool, motor, clutch, anchoring arm, etc.) and partially process it so that the computer 1015 can read this information. After tools 1012 have been deployed within the well 1011 and have reached their desired positions, anchoring arms 1018 of the tools may be opened to anchor the tools within the well. Tools 1012 are configured to receive command signals from controller 1015 along logging cables 1014 and 1019. In one application, any information sent by the tools to the surface 1017 of the well may be received and stored in controller 1015. Connecting cable 1019 that connects controller 1015 to the telemetry device 1016 may have one or more strength members for being able to support the weight of all tools 1012.

The disclosed exemplary embodiments provide an apparatus and method for sensing data with a hybrid sensing apparatus. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A hybrid sensing apparatus for collecting data, the apparatus comprising:
   an optical sensing component having an optical cable that acquires a first set of data; and
   an electrical sensing component having sensor tools that acquires a second set of data,
   wherein the electrical sensing component extends parallel to the optical cable for a first length (L1) and then antiparallel to the optical cable for a second length (L2), said sensor tools being located along the second length (L2) of the electrical sensing component.

2. The apparatus of claim 1, wherein the electrical sensing component includes a first electrical cable, a telemetry box and a second electrical cable, the first electrical cable, the telemetry box and the second electrical cable are electrically connected to each other in this order, and the sensor tools are electrically connected to the second electrical cable.

3. The apparatus of claim 2, wherein each sensor tool is mechanically attached to the first electrical cable.

4. The apparatus of claim 2, wherein each sensor tool has a housing, a sensor located inside the housing, and a mechanical connector attached to an outside of the housing, and the mechanical connector partially houses the first electrical cable and the optical fiber.

5. The apparatus of claim 1, wherein the sensor tools include accelerometers or geophones.

6. The apparatus of claim 1, wherein both the first and second sets of data are related to seismic parameters for monitoring.

7. The apparatus of claim 1, wherein measurements of the optical sensing component are calibrated based on the second set of data.

8. The apparatus of claim 1, wherein the optical component measures a third set of data, in addition and different from the first set of data.

9. The apparatus of claim 1, wherein the optical sensing component comprises:
   an optical interrogation device connected to one end of the optical cable.

10. The apparatus of claim 1, further comprising:
    a controller for processing the second set of data.

11. The apparatus of claim 1, wherein the optical cable includes an optical fiber with no cuts along its length and the optical fiber is longer than the first length (L1) and extends past the electrical sensing component.

12. The apparatus of claim 1, wherein at least one part of the optical cable and the first length of the electrical cable are coupled together to form a hybrid cable.

13. The apparatus of claim 1, wherein a sensor tool comprises an anchor for stabilizing the sensor tool inside the well.

14. A method for collecting data with a hybrid sensing apparatus, the method comprising:
    lowering into a well the hybrid sensing apparatus, wherein the hybrid sensing apparatus includes an optical sensing component and an electrical sensing component;
    acquiring a first set of data with the optical sensing component; and
    acquiring a second set of data with the electrical sensing component,
    wherein the electrical sensing component extends parallel to the optical sensing component for a first length (L1) and then antiparallel to the optical sensing component for a second length (L2).

15. The method of claim 14, wherein at least one of the first and second sets of data is related to seismic data.

16. The method of claim 14, further comprising:
    calibrating measurements of the optical sensing component based on the second set of data.

17. The method of claim 14, further comprising:
    measuring with the optical sensing component a third set of data, in addition and different from the first set of data.

18. A hybrid sensing apparatus for collecting data inside a well, the apparatus comprising:
    a hybrid cable extending inside the well, from a head of the well, the hybrid cable including a first electrical cable and an optical fiber that run in parallel to each other;
    a telemetry unit connected to the hybrid cable;
    a second electrical cable extending from the telemetry unit back toward the head of the well; and plural sensor tools located along the second electrical cable,
wherein both the optical fiber and the plural sensor tool collect data.

19. The apparatus of claim 18, wherein the optical fiber is longer than the first electrical cable and the optical fiber extends past the telemetry unit down in the well.

20. The apparatus of claim 19, wherein the optical fiber collects at least one of non-seismic data and seismic data.

21. The apparatus of claim 18, wherein the plural sensor tools are electrically connected to the second electrical cable and mechanically attached to an outside of the hybrid cable.

22. The apparatus of claim 18, further comprising:
an interrogator connected to the optical fiber and configured to collect distributed acoustic sensing measurements.

23. The apparatus of claim 18, wherein the sensor tools include geophones or accelerometers to obtain a vertical seismic profile of the well.

* * * * *